US012397546B2

(12) United States Patent
Yoda

(10) Patent No.: US 12,397,546 B2
(45) Date of Patent: Aug. 26, 2025

(54) LIQUID DISCHARGE APPARATUS

(71) Applicant: Kazuhisa Yoda, Kanagawa (JP)

(72) Inventor: Kazuhisa Yoda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 338 days.

(21) Appl. No.: 18/103,492

(22) Filed: Jan. 31, 2023

(65) Prior Publication Data

US 2023/0278332 A1 Sep. 7, 2023

(30) Foreign Application Priority Data

Feb. 1, 2022 (JP) ................................ 2022-014530
Nov. 29, 2022 (JP) ................................ 2022-190031

(51) Int. Cl.

| | |
|---|---|
| ***B41J 2/045*** | (2006.01) |
| ***B41J 2/165*** | (2006.01) |
| ***B41J 2/17*** | (2006.01) |
| ***B41J 2/175*** | (2006.01) |
| ***B41J 29/38*** | (2006.01) |
| *B41J 25/00* | (2006.01) |

(52) U.S. Cl.

CPC ....... *B41J 2/04536* (2013.01); *B41J 2/04586* (2013.01); *B41J 2/16508* (2013.01); *B41J 2/1721* (2013.01); *B41J 2/175* (2013.01); *B41J 2/17509* (2013.01); *B41J 2/1752* (2013.01); *B41J 2/17566* (2013.01); *B41J 29/38* (2013.01); *B41J 2/16514* (2024.05); *B41J 2/16526* (2013.01); *B41J 2025/008* (2013.01)

(58) Field of Classification Search

CPC ................ B41J 2/04536; B41J 2/04586; B41J 2/16508; B41J 2/1721; B41J 2/175; B41J 2/17509; B41J 2/1752; B41J 2/17566; B41J 29/38; B41J 2/16514; B41J 2/16526; B41J 2025/008

See application file for complete search history.

(56) References Cited

U.S. PATENT DOCUMENTS

2014/0292892 A1* 10/2014 Dan .................... B41J 2/17546 347/19
2017/0106656 A1* 4/2017 Conzelmann .......... B41J 11/057
2018/0272720 A1* 9/2018 Mashima ............ B41J 2/17566
2019/0329555 A1 10/2019 Yoda (Continued)

FOREIGN PATENT DOCUMENTS

JP 2006-076155 3/2006
JP 2020-142455 9/2020

*Primary Examiner* — Henok D Legesse
(74) *Attorney, Agent, or Firm* — XSENSUS LLP

(57) ABSTRACT

A liquid discharge apparatus includes a body, a liquid discharge head, a liquid receptacle, an instruction device, and circuitry. The liquid discharge head discharges a liquid. The liquid receptacle is replaceable by detachably attaching to the body. The liquid receptacle stores a waste liquid discharged from the liquid discharge head. The instruction device displays an instruction and receives code data assigned to the liquid receptacle. The circuitry causes the instruction device to display the instruction to replace the liquid receptacle storing the waste liquid, an amount of which is greater than a threshold, with another liquid receptacle, and causes the instruction device to display the instruction to input the code data assigned to another liquid receptacle.

18 Claims, 6 Drawing Sheets

(56) References Cited

U.S. PATENT DOCUMENTS

| | | | |
|---|---|---|---|
| 2020/0290342 A1 | 9/2020 | Yoda | |
| 2021/0155003 A1 | 5/2021 | Kikuchi et al. | |
| 2021/0197567 A1* | 7/2021 | Yoda | B41J 2/16526 |

* cited by examiner

LIQUID DISCHARGE APPARATUS

CROSS-REFERENCE TO RELATED APPLICATIONS

This patent application is based on and claims priority pursuant to 35 U.S.C. § 119(a) to Japanese Patent Application Nos. 2022-014530, filed on Feb. 1, 2022, and 2022-190031, filed on Nov. 29, 2022, in the Japan Patent Office, the entire disclosure of each of which is hereby incorporated by reference herein.

BACKGROUND

Technical Field

Embodiments of the present disclosure relate to a liquid discharge apparatus.

Related Art

In the related art, a liquid discharge apparatus is known that includes a liquid discharge head, a liquid receptacle, and an instruction device. The liquid discharge head discharges a liquid. The liquid receptacle stores a waste liquid drained from the liquid discharge head and is detachably attached to an apparatus body of the liquid discharge apparatus. The instruction device instructs a user to replace the liquid receptacle when a liquid storage amount of the liquid receptacle exceeds a threshold.

SUMMARY

Embodiments of the present disclosure describe an improved liquid discharge apparatus that includes a body, a liquid discharge head, a liquid receptacle, an instruction device, and circuitry. The liquid discharge head discharges a liquid. The liquid receptacle is replaceable by detachably attaching to the body. The liquid receptacle stores a waste liquid discharged from the liquid discharge head. The instruction device displays an instruction and receives code data assigned to the liquid receptacle. The circuitry causes the instruction device to display the instruction to replace the liquid receptacle storing the waste liquid, an amount of which is greater than a threshold, with another liquid receptacle, and causes the instruction device to display the instruction to input the code data assigned to another liquid receptacle.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
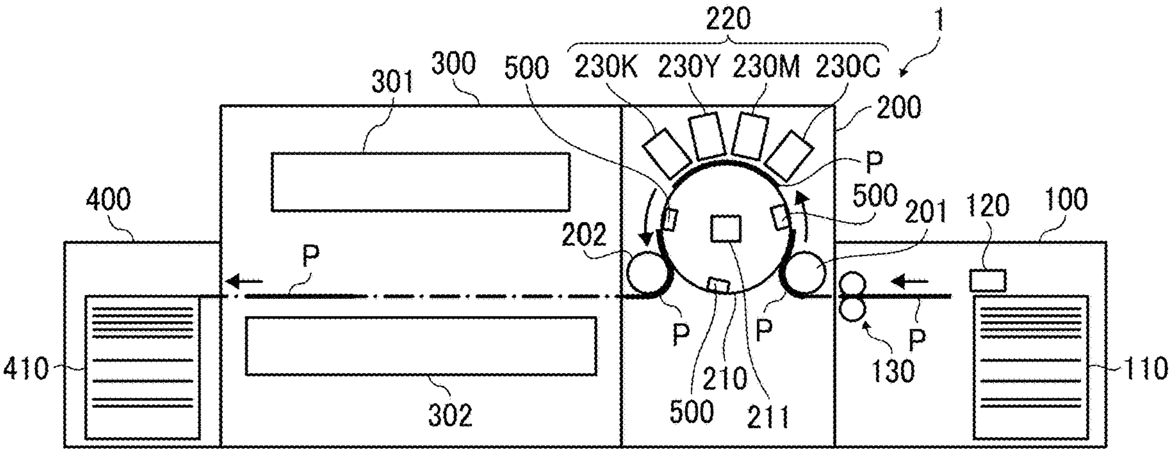
FIG. 1 is a schematic view of a printer which is an inkjet recording apparatus as a liquid discharge apparatus according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Overall Description

FIG. 1 is a schematic view of a printer 1 which is an inkjet recording apparatus as a liquid discharge apparatus according to the present embodiment. The printer 1 includes a sheet feeding unit 100, an image forming unit 200, a drying unit 300, and a sheet output unit 400. In the printer 1, the image forming unit 200 forms an image with ink as a liquid for image formation on a sheet P as a recording medium fed from the sheet feeding unit 100. After the drying unit 300 dries the ink adhering to the sheet P, the sheet P is output in the sheet output unit 400.

Sheet Feeding Unit

As illustrated in FIG. 1, the sheet feeding unit 100 includes a sheet feeding tray 110 on which a plurality of sheets P is stacked, a feeding device 120 that separates and feeds the sheets P one by one from the sheet feeding tray 110, and a registration roller pair 130 that feeds the sheets P to the image forming unit 200.

As the feeding device 120, any feeding device, such as a device using rollers or a device using air suction, can be used. After the leading end of the sheet P fed from the sheet feeding tray 110 by the feeding device 120 reaches the registration roller pair 130, the registration roller pair 130 is driven at a predetermined timing to feed the sheet P to the image forming unit 200. In the present embodiment, the configuration of the sheet feeding unit 100 is not limited to any particular configuration as long as the sheet feeding unit 100 can feed the sheet P to the image forming unit 200.

Image Forming Unit

Figure 2:
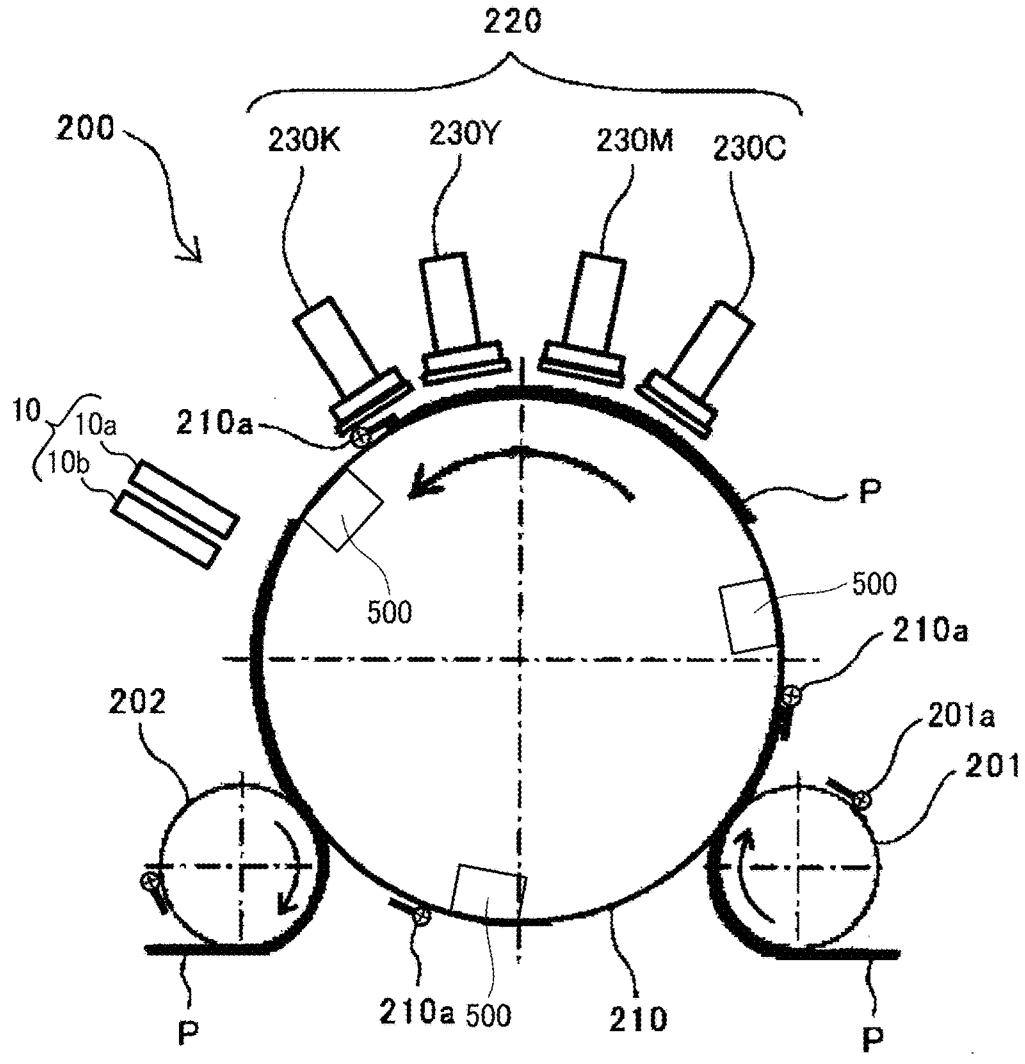
FIG. 2 is a schematic view of an image forming unit of the printer in FIG. 1.

The image forming unit 200 includes a receiving cylinder 201, a sheet conveyance drum 210 (conveyor), an ink discharge unit 220, and a delivery cylinder 202. FIG. 2 is a schematic view of the image forming unit 200.

The receiving cylinder 201 receives the sheet P (i.e., the recording medium) fed from the sheet feeding unit 100 and conveys the sheet P downstream. The sheet conveyance drum 210 has a cylindrical shape and conveys the sheet P, which is conveyed from the receiving cylinder 201, carried on the outer circumferential surface thereof. The ink discharge unit 220 discharges ink toward the sheet P conveyed by the sheet conveyance drum 210. The delivery cylinder 202 delivers the sheet P conveyed by the sheet conveyance drum 210 to the drying unit 300.

The leading end of the sheet P conveyed from the sheet feeding unit 100 to the image forming unit 200 is gripped by a sheet gripper 201*a* disposed on the surface of the receiving cylinder 201. The sheet P is conveyed along with the movement of the surface of the receiving cylinder 201. The sheet P conveyed by the receiving cylinder 201 is transferred to the sheet conveyance drum 210 at a position facing each other.

A sheet gripper 210*a* is also disposed on the sheet conveyance drum 210, and the leading end of the sheet P transferred to the sheet conveyance drum 210 is gripped by the sheet gripper 210*a*. Multiple suction holes are dispersedly formed on the surface of the sheet conveyance drum 210. A suction device 211 generates a suction air flow toward the inside of the sheet conveyance drum 210 through each suction hole.

The leading end of the sheet P transferred from the receiving cylinder 201 to the sheet conveyance drum 210 is gripped by the sheet gripper 210*a*. Thereafter, the sheet P is sucked onto the sheet conveyance drum 210 by the suction air flow and is conveyed as the sheet conveyance drum 210 moves.

The ink discharge unit 220 according to the present embodiment discharges ink of four colors of C (cyan), M (magenta), Y (yellow), and K (black) to form an image and includes individual liquid discharge heads 230 (230C, 230M, 230Y, and 230K) for each ink. Since the four liquid discharge heads 230 have the same configuration except that the colors of ink to be discharged are different, in the following description, suffixes such as "C," "M," "Y," and "K" indicating the colors of ink to be discharged are appropriately omitted.

The configuration of the liquid discharge head 230 is not limited to any particular configuration and may be any configuration that can discharge a liquid from a discharge orifice (nozzle) of the liquid discharge head 230. In some embodiments, the ink discharge unit 220 may include a liquid discharge head that discharges special ink such as white, gold, and silver or a liquid discharge head that discharges a surface coating liquid that does not form an image.

Discharge operations of the four liquid discharge heads 230 of the ink discharge unit 220 are controlled by drive signals corresponding to image data. When the sheet P conveyed by the sheet conveyance drum 210 passes through a region facing the ink discharge unit 220, color inks are discharged from the four liquid discharge heads 230 to form an image corresponding to the image data. In the present embodiment, the configuration of the image forming unit 200 is not limited to any particular configuration as long as an image is formed by applying a liquid onto the sheet P.

Drying Unit

As illustrated in FIG. 1, the drying unit 300 includes a dryer 301 and a conveyor 302. The dryer 301 dries ink adhered to the sheet P by the image forming unit 200. The conveyor 302 conveys the sheet P conveyed from the image forming unit 200.

The sheet P conveyed from the image forming unit 200 is received by the conveyor 302, then conveyed so as to pass through the dryer 301, and delivered to the sheet output unit 400. When the sheet P passes through the dryer 301, ink on the sheet P is subjected to a drying process. Accordingly, liquid components such as moisture in the ink are evaporated, the ink is fixed on the sheet P, and curling of the sheet P is prevented.

Sheet Output Unit

The sheet output unit 400 includes an output tray 410 on which a plurality of sheets P is stacked. The sheet P conveyed from the drying unit 300 is sequentially stacked and held on the output tray 410. In the present embodiment, the configuration of the sheet output unit 400 is not limited to any particular configuration and may be any configuration that can stack the sheet P ejected from the drying unit 300.

Other Functional Units

As described above, the printer 1 according to the present embodiment includes the sheet feeding unit 100, the image forming unit 200, the drying unit 300, and the sheet output unit 400. However, other functional units may be added as appropriate. For example, a pretreatment unit that treats the sheet P before image formation may be added between the sheet feeding unit 100 and the image forming unit 200. Alternatively, an aftertreatment unit that treats the sheet P after the image formation may be added between the drying unit 300 and the sheet output unit 400.

For example, the pretreatment unit applies a pretreatment liquid, which reacts with ink, to the sheet P to reduce bleeding of the ink. However, the content of the pretreatment is not limited particularly. For example, the aftertreatment unit reverses the sheet P on which the image is formed by the image forming unit 200 and sends the sheet P again to the image forming unit 200 to form images on both sides of the sheet P, or binds a plurality of sheets P on which the image is formed. However, there is no particular limitation on the content of the aftertreatment performed by the aftertreatment unit.

In the present embodiment, the printer 1 which is the inkjet recording apparatus as an example of the liquid discharge apparatus is described. The printer 1 includes the liquid discharge head 230 that discharges ink as a liquid toward a surface to be dried of the sheet P. In the present embodiment, each of the liquid discharge heads 230 includes a plurality of liquid discharge head modules arranged in a sheet width direction, which is orthogonal to a conveyance direction of the sheet P, to form a long liquid discharge head (line head). Unless otherwise specified, the "liquid discharge head" means the "line head."

Each of the liquid discharge heads 230 according to the present embodiment is a line-type liquid discharge head having a length (length in a main scanning direction) across the sheet P in the sheet width direction and discharges ink onto the sheet P. In the present embodiment, the individual liquid discharge heads 230 are radially arranged around a rotation shaft of the sheet conveyance drum 210.

Figure 3:
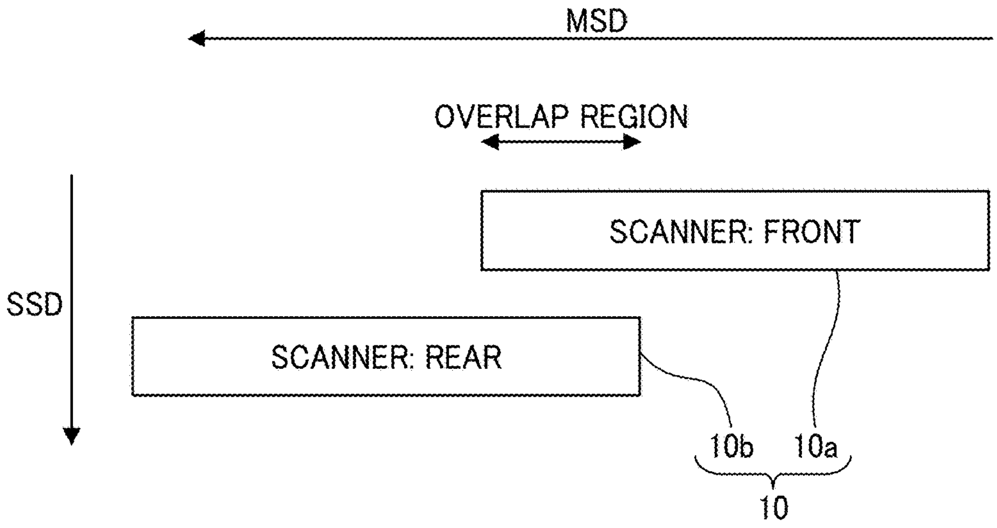
FIG. 3 is a diagram illustrating arrangement of a first in-line sensor and a second in-line sensor of the image forming unit in FIG. 2.

A scanner unit 10 as an image detector is disposed downstream from the ink discharge unit 220 in the conveyance direction of the sheet P so as to face the sheet conveyance drum 210. The scanner unit 10 includes a first in-line sensor 10*a* and a second in-line sensor 10*b*. As illustrated in FIG. 3, the first in-line sensor 10*a* is disposed on one side in the main scanning direction (sheet width direction) indicated by arrow MSD in FIG. 3, and the second in-line sensor 10*b* is disposed on the other side in the main scanning direction. In the present embodiment, the first in-line sensor 10*a* and the second in-line sensor 10*b* are disposed at different positions in a sub-scanning direction (conveyance direction) indicated by arrow SSD in FIG. 3.

An end of the first in-line sensor 10*a* on the other side and an end of the second in-line sensor 10*b* on the one side overlap each other in the main scanning direction (an overlap region illustrated in FIG. 3). As a result, the first in-line sensor 10*a* and the second in-line sensor 10*b* can read the image formed on the sheet P continuously over the entire area of the sheet P in the main scanning direction. The scanner unit 10 reads a test pattern which is periodically formed on the sheet P. The printer 1 adjusts image quality or the like based on the test pattern read by the scanner unit 10.

Depending on an image to be printed, some of the liquid discharge heads 230 may frequently discharge ink and some of the liquid discharge heads 230 may rarely discharge ink. In the liquid discharge head 230 that does not frequently discharge ink, the ink may be dried and thickened, and a desired amount of ink may not be discharged at a desired timing. In order to prevent such a situation, the liquid discharge head 230 performs a dummy discharge when ink is not discharged for a predetermined duration.

In the present embodiment, three dummy discharge receptacles 500 as liquid receptacles are disposed in the sheet conveyance drum 210 at equal intervals in a rotation direction of the sheet conveyance drum 210 to receive ink discharged in the dummy discharge (or drained) from the liquid discharge head 230 and store the received ink. In the present embodiment, the dummy discharge receptacle 500 is disposed between the sheets P gripped by the sheet gripper 210*a*.

The sheet conveyance drum 210 and the dummy discharge receptacle 500 rotate together. When the dummy discharge receptacle 500 passes a position facing the liquid discharge head 230 that does not discharge ink for the predetermined duration, the liquid discharge head 230 performs the dummy discharge toward the dummy discharge receptacle 500.

The dummy discharge receptacle 500 includes an absorber made of sponge or the like and a box-shaped case accommodating the absorber. The absorber absorbs a waste ink as a waste liquid discharged in the dummy discharge (dummy-discharged). The box-shaped case has an opening on a surface facing the liquid discharge head 230 to store the waste ink discharged in the dummy discharge.

The dummy discharge receptacle 500 rotates together with the sheet conveyance drum 210. With such a configuration, as the sheet conveyance drum 210 rotates, the opening of the dummy discharge receptacle 500 faces downward. However, in the present embodiment, the absorber in the dummy discharge receptacle 500 absorbs and holds the waste ink discharged in the dummy discharge. As a result, even if the opening of the dummy discharge receptacle 500 faces downward, the stored waste ink does not drop from the opening. The dummy discharge receptacle 500 is detachably attached into the sheet conveyance drum 210 and is replaceable with a new dummy discharge receptacle.

Figure 4:
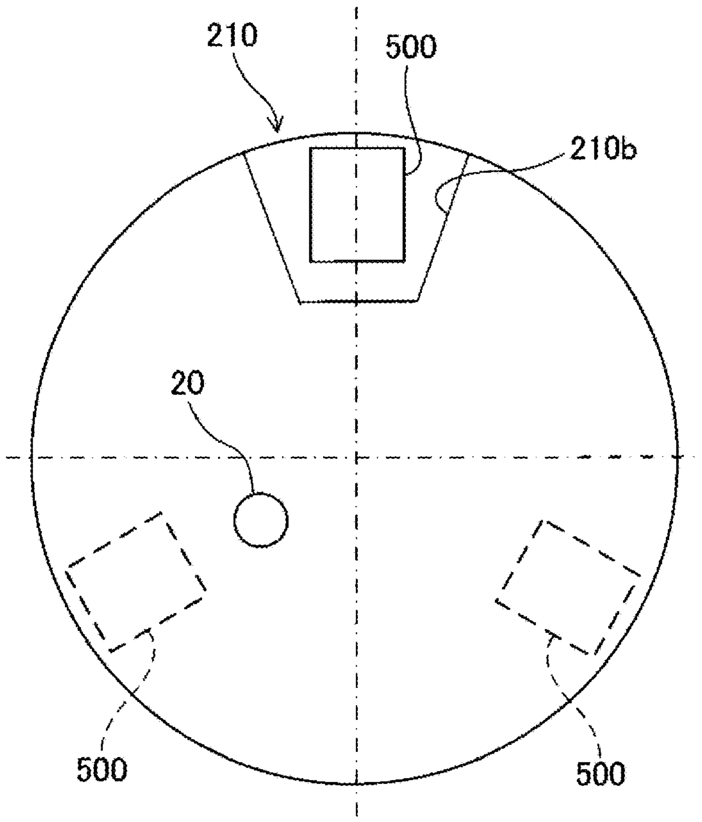
FIG. 4 is a diagram illustrating a replacement position of a dummy discharge receptacle of the image forming unit in FIG. 2.

FIG. 4 is a diagram illustrating a replacement position of the dummy discharge receptacle 500. The replacement position of the dummy discharge receptacle 500 is at the top of the sheet conveyance drum 210 in the vertical direction. The dummy discharge receptacle 500 is slid along the rotation shaft of the sheet conveyance drum 210 to be attached to and detached from the sheet conveyance drum 210. A space 210*b* is disposed around the replacement position of the dummy discharge receptacle 500 to allow the dummy discharge receptacle 500 to be slid.

As described above, the dummy discharge receptacle 500 is replaced at the replacement position, that is, at the top of the sheet conveyance drum 210 in the vertical direction. As a result, when the dummy discharge receptacle 500 is replaced, the opening of the dummy discharge receptacle 500 faces upward, thereby preventing the waste ink absorbed by the absorber from leaking from the opening of the dummy discharge receptacle 500.

Further, since the replacement position of the dummy discharge receptacle 500 is a predetermined rotation position, the space 210*b* is disposed only at the replacement position of the dummy discharge receptacle 500 to allow the dummy discharge receptacle 500 to be slid, thereby increasing the degree of freedom in the layout in the printer 1.

A switch 20 for manually rotating the sheet conveyance drum 210 is disposed on a frame or the like that holds the sheet conveyance drum 210. After the dummy discharge receptacle 500 positioned at the replacement position is replaced with a new one, the user presses the switch 20 to rotate the sheet conveyance drum 210. Then, when another dummy discharge receptacle 500 to be replaced is positioned at the replacement position, the user releases the switch 20 to stop the rotation of the sheet conveyance drum 210, thereby positioning the dummy discharge receptacle 500 to be replaced at the replacement position.

Figure 5:
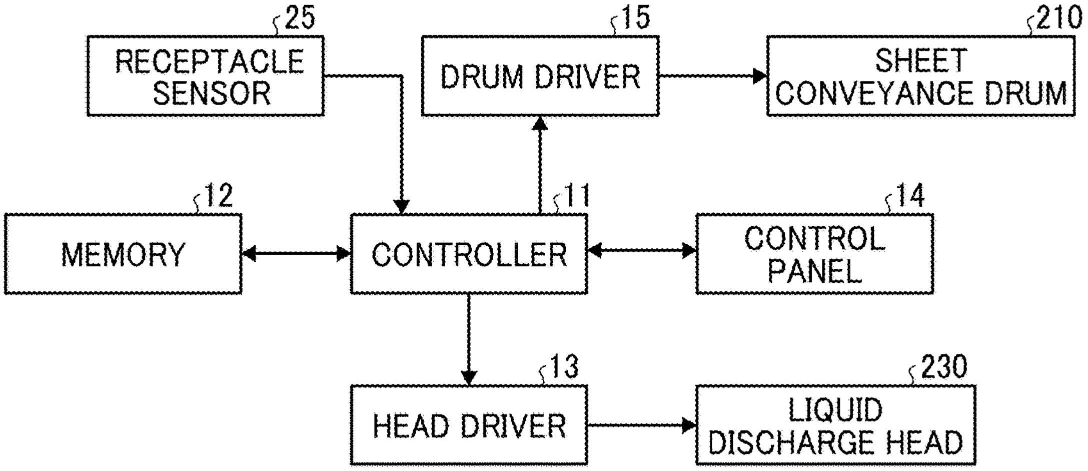
FIG. 5 is a block diagram illustrating control of replacement of the dummy discharge receptacle.
Figure 6:
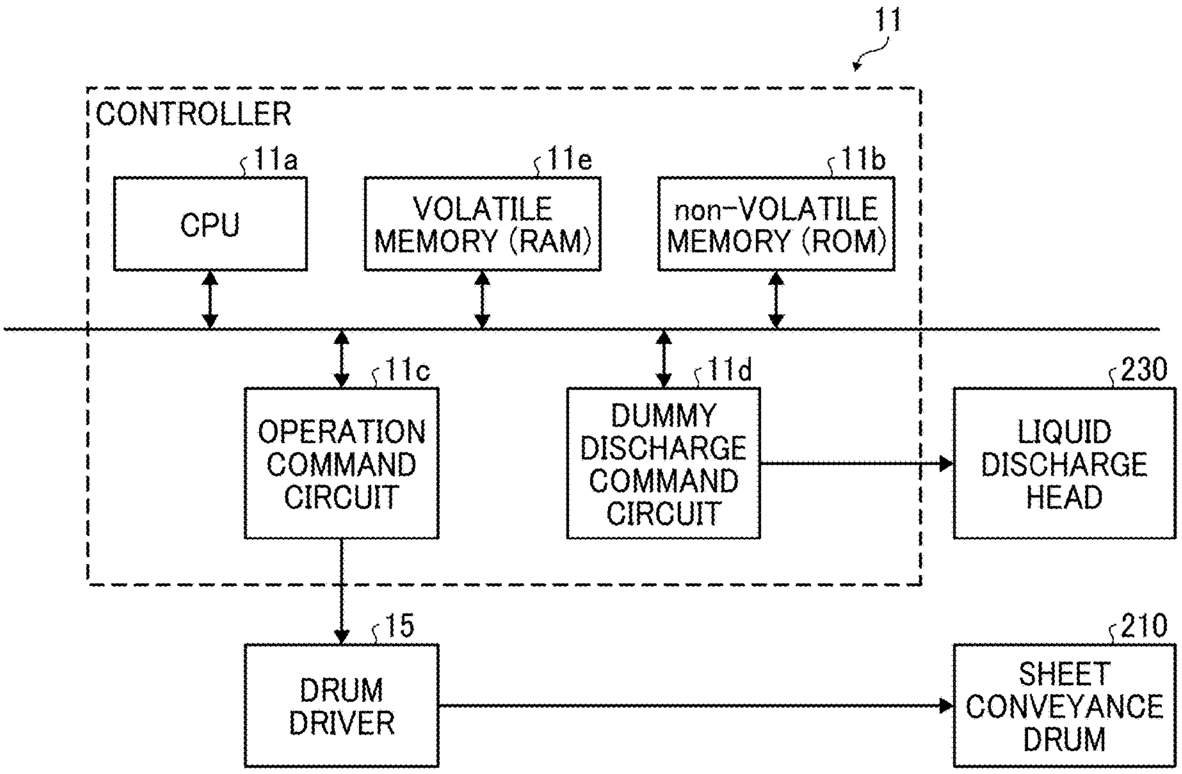
FIG. 6 is a block diagram of a controller of the printer.

FIG. 5 is a block diagram illustrating control of replacement of the dummy discharge receptacle 500. FIG. 6 is a block diagram of a controller 11 of the printer 1. The controller 11 includes a central processing unit (CPU) 11*a*, a volatile memory 11*e* such as a random access memory (RAM), a non-volatile memory 11*b* such as a read only memory (ROM), an operation command circuit 11*c*, and a dummy discharge command circuit 11*d* as illustrated in FIG. 6. A memory 12, a head driver 13 that drives the liquid discharge head 230, and a control panel 14 as an instruction device are connected to the controller 11 as illustrated in FIG. 5. A drum driver 15 that drives the sheet conveyance drum 210, a receptacle sensor 25 that detects the dummy discharge receptacle 500 set in the sheet conveyance drum 210 are also connected to the controller 11.

The operation command circuit Ile of the controller 11 outputs a drive signal to the drum driver 15. The drum driver 15 controls a motor that rotates the sheet conveyance drum 210 based on the drive signal from the operation command circuit 11*c*. The dummy discharge command circuit 11*d* outputs a dummy discharge output signal to the liquid discharge head 230. The liquid discharge head 230 performs the dummy discharge based on the dummy discharge output signal.

Examples of the memory 12 includes a non-volatile storage memory such as a flash memory or a hard click drive (HDD). The memory 12 records code data, which is described later, assigned to the dummy discharge receptacle 500 and an amount of ink stored in the dummy discharge receptacles 500 (also referred to as an ink storage amount) in association with each other. The code data may be recorded in the memory 12 in association with other data (e.g., replacement date and time, country of use, number of printed sheets, and the like) in addition to the ink storage amount. In addition to the ink storage amount, other data (e.g., replacement date and time, country of use, number of printed sheets, and the like) associated with the code data, which is recorded in the memory 12, can be used as analysis data for analyzing the printer 1.

The memory 12 also records code data corresponding to the dummy discharge receptacle 500 that has reached an end as end history data. Here, the "end" means that the ink storage amount of the dummy discharge receptacle 500 is greater than a threshold, and the dummy discharge receptacle 500 is almost full of the waste ink. The end history data is used to check whether the code data of the dummy discharge receptacle 500 input by a user (i.e., an input code data) matches the code data, recorded in the memory 12, of the dummy discharge receptacle 500 that has reached the end, as described later.

The code data includes, for example, a plurality of alphanumeric characters created according to a predetermined rule, and is input by a user after the replacement of the dummy discharge receptacle 500 is completed, as described later. The predetermined rule can be determined by the user in advance, for example, to restrict available characters, the number of characters, and the like. For example, paper on which the code data is written is packed together with a new dummy discharge receptacle 500 in a package. After the dummy discharge receptacle 500 has been replaced, the user takes out the paper on which the code data is written from the package in which the new dummy discharge receptacle 500 is packed, and inputs the code data written on the paper with the control panel 14. Thus, the printer 1 acquires the code data corresponding to the replaced new dummy discharge receptacle 500.

In addition, a decal on which the code data is written may be directly attached to the dummy discharge receptacle 500. When the dummy discharge receptacle 500 is replaced with a used dummy discharge receptacle which can still sufficiently store the ink, the paper on which the code data of the used dummy discharge receptacle is written may be lost, as described later. In such a case, the user can take a note of the code data on the decal attached to the used dummy discharge receptacle at the time of replacement, and input the code data after the replacement of the dummy discharge receptacle 500 is completed.

The control panel 14 includes a touch panel as a display unit and various keys as an operation unit. The control panel 14 displays an image on the touch panel and receives various types of data input with the various keys operated by the user.

The non-volatile memory (ROM) 11*b* of the controller 11 stores a calculation program for calculating the amount of ink stored in the dummy discharge receptacle 500 (i.e., the ink storage amount of the dummy discharge receptacle 500). The calculation program is loaded and executed by the CPU 11*a*. Specifically, the controller 11 counts the number of ink discharges to the dummy discharge receptacle 500, and calculates the amount of waste ink dummy-discharged to the dummy discharge receptacle 500 based on a count value of the ink discharges. The controller 11 adds the calculated amount of waste ink to the ink storage amount recorded in the memory 12, thereby updating the ink storage amount of the dummy discharge receptacle 500. Alternatively, the controller 11 may calculate the amount of waste ink dummy-discharged to the dummy discharge receptacle 500 based on the drive time of the liquid discharge bead 230 during the dummy discharge. Thus, the controller 11 functions as a calculation unit that calculates the ink storage amount stored in the dummy discharge receptacle 500.

The non-volatile memory (ROM) 11*b* of the controller 11 stores a control program for determining the end of the dummy discharge receptacle 500 based on the calculated ink storage amount of the dummy discharge receptacle 500. The control program is loaded and executed by the CPU 11*a*. Specifically, when the calculated ink storage amount of the dummy discharge receptacle 500 is greater than the threshold, the controller 11 determines that a remaining storage space to store the waste ink in the dummy discharge receptacle 500 is small and that the dummy discharge receptacle 500 has reached the end.

As described above, in the present embodiment, the controller 11 manages the ink storage amount of the dummy discharge receptacle 500 on software by the control program, thereby determining whether the dummy discharge receptacle 500 has reached the end by software. Accordingly, the number of components and the cost of the printer 1 can be reduced as compared with a printer including a sensor that detects the ink storage amount stored in the dummy discharge receptacle 500 by hardware to determine whether the dummy discharge receptacle 500 has reached the end.

The non-volatile memory (ROM) 11*b* of the controller 11 also stores a control program for controlling a replacement mode to be executed when the dummy discharge receptacle 500 is replaced, and the control program is loaded and executed by the CPU 11*a*. The non-volatile memory (ROM) 11*b* of the controller 11 also stores a control program for executing a post-replacement process after the dummy discharge receptacle 500 is replaced, and the control program is loaded and executed by the CPU 11*a*. In the present embodiment, examples of the post-replacement process include a process of changing the ink storage amount recorded in the memory 12.

Figure 7:
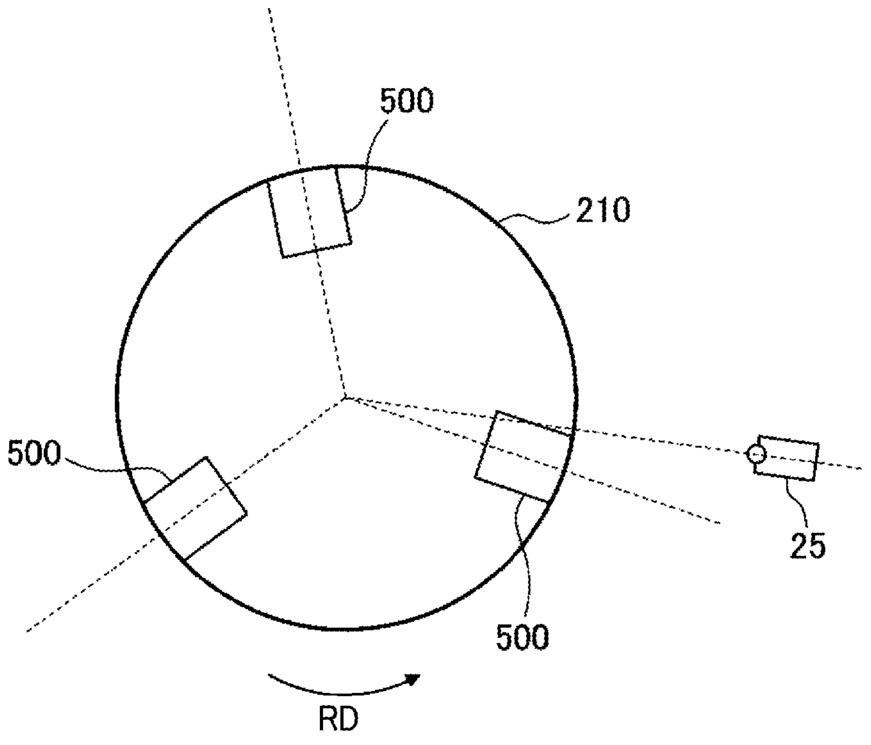
FIG. 7 is a diagram illustrating a set detection in which the three dummy discharge receptacles set in a sheet conveyance drum are detected by a receptacle sensor.

FIG. 7 is a diagram illustrating a set detection in which the three dummy discharge receptacles 500 set in the sheet conveyance drum 210 are detected by the receptacle sensor 25. As illustrated in FIG. 7, the receptacle sensor 25 faces the sheet conveyance drum 210. As the sheet conveyance drum 210 rotates in the rotation direction indicated by arrow RD, when a portion of the sheet conveyance drum 210 in which the dummy discharge receptacle 500 is to be set (i.e., an attachment position) passes a detection position of the receptacle sensor 25, the receptacle sensor 25 detects whether the dummy discharge receptacle 500 is set in the attachment position. In the present embodiment, the receptacle sensor 25 individually detects the three dummy discharge receptacles 500 attached to the sheet conveyance drum 210 during one rotation of the sheet conveyance drum 210.

The set detection of the three dummy discharge receptacles 500 set in the sheet conveyance drum 210 by the receptacle sensor 25 is performed when the power source of the printer 1 is turned on or when a replacement mode described later is executed. When the receptacle sensor 25 detects an unset attachment position in which the dummy discharge receptacle 500 is not attached in the set detection after the power source of the printer 1 is turned on the controller 11 prohibits a printing operation of the printer 1. As a result, the dummy discharge is prohibited, and the waste ink is not discharged (ink is not dummy-discharged) toward the unset attachment position of the sheet conveyance drum 210 in which the dummy discharge receptacle 500 is not set. Thus, the inside of the printer 1 is not stained with the ink, thereby preventing the damage of the printer 1 due to the ink.

Figure 8:
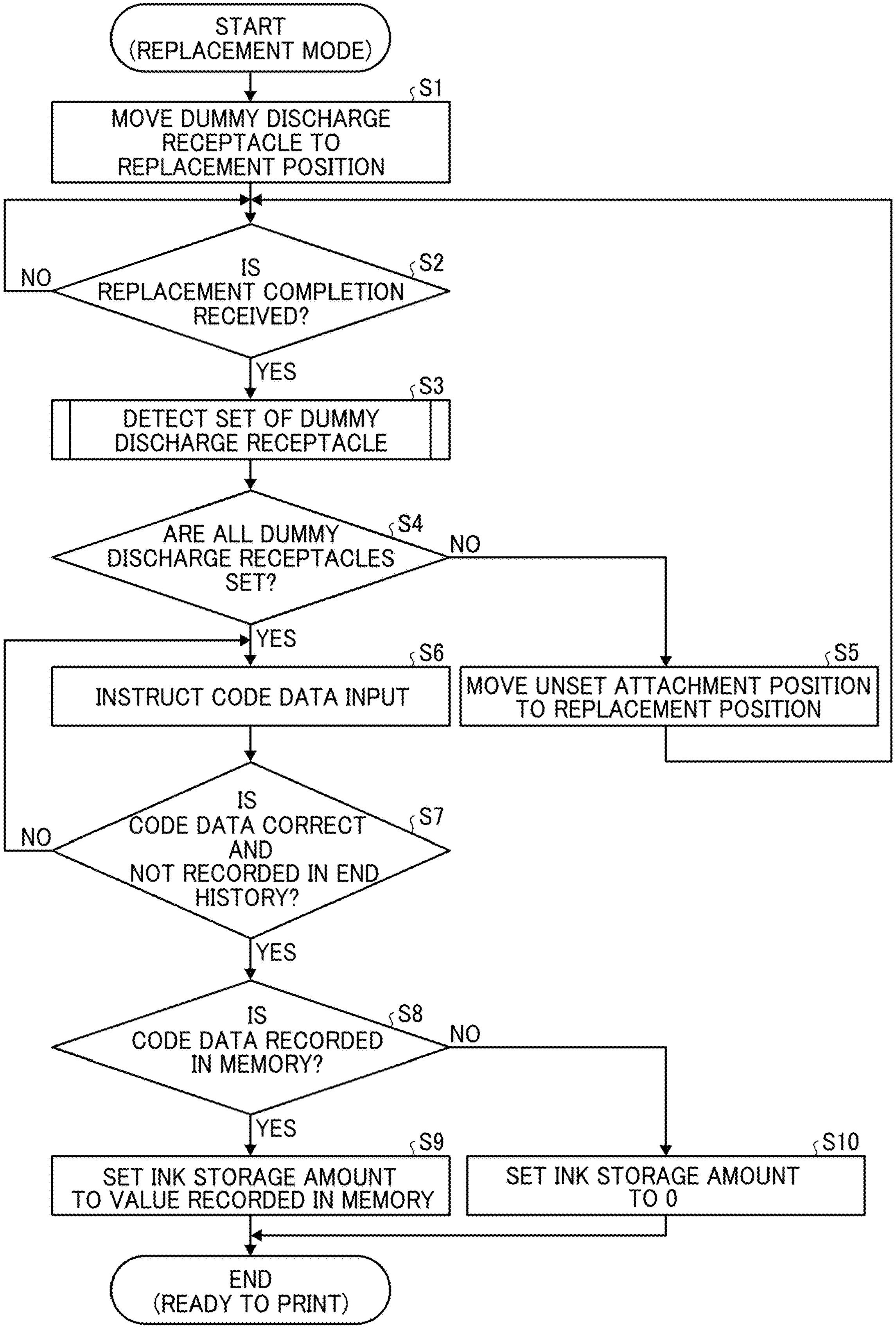
FIG. 8 is a flowchart of control of a replacement mode according to the present embodiment.

FIG. 8 is a flowchart of control of the replacement mode according to the present embodiment. When the controller 11 determines that any one of the three dummy discharge receptacles 500 has reached the end because the ink storage amount of the dummy discharge receptacles 500 is greater than the threshold, the controller 11 displays an instruction to execute the replacement mode for replacing the dummy discharge receptacle 500 on the touch panel of the control panel 14. The controller 11 records the code data corresponding to the dummy discharge receptacle 500 determined to be the end as the end history data in the memory 12. When the controller 11 determines that the ink storage amount is greater than the threshold and the dummy discharge receptacle has reached the end, the controller 11 may prohibit the printing operation so that the use of the printer 1 is not continued. The controller 11 may display an instruction to execute the replacement mode on the touch panel of the control panel 14 and sound an alarm from a speaker of the printer 1.

Further, two thresholds may be provided, that is, a threshold indicating that the ink storage amount is near end and the threshold indicating that the ink storage amount is the end. When the ink storage amount is equal to or more than the threshold indicating the near end, the controller 11 displays a warning indicating that the dummy discharge receptacle 500 is close to the end on the touch panel of the control panel 14 to instruct the user to prepare a new dummy discharge receptacle for replacement. When the user operates the control panel 14 to execute the replacement mode based on the instruction to execute the replacement mode displayed on the control panel 14, the controller 11 prohibits the printing operation during the replacement mode.

Even when the instruction to execute the replacement mode is not displayed, the user can operate the control panel 14 at a timing when the user wants to replace the dummy discharge receptacle 500, for example, before a high-volume printing, to execute the replacement mode.

In the replacement mode according to the present embodiment, all the dummy discharge receptacles 500 attached to the sheet conveyance drum 210 are replaced. The dummy discharge is not biased to one of the three dummy discharge receptacles 500 attached to the sheet conveyance drum 210, and is distributed substantially equally among the three dummy discharge receptacles 500 in total. Therefore, when one of the three dummy discharge receptacles 500 has reached the end, the other two dummy discharge receptacles 500 also have the ink storage amount close to the end. Therefore, it is efficient to replace all the dummy discharge receptacles 500 attached to the sheet conveyance drum 210. Further, it is preferable to replace all the dummy discharge receptacles 500 attached to the sheet conveyance drum 210 because the frequency of replacement of the dummy discharge receptacles 500 can be reduced as compared with the case of replacing only one of the dummy discharge receptacles 500 that has reached the end.

As described above, in the present embodiment, since all the dummy discharge receptacles 500 attached to the sheet conveyance drum 210 are replaced at a time, one piece of code data (i.e., identical code data) is assigned to the three dummy discharge receptacles 500 attached to the sheet conveyance drum 210.

When the replacement mode is executed, the controller 11 causes the sheet conveyance drum 210 to rotate so as to move the dummy discharge receptacle 500, which is closest to the replacement position illustrated in FIG. 4 among the three dummy discharge receptacles 500, to the replacement position (step S1). In addition, when the replacement mode is executed, if the ink storage amount recorded in the memory 12 is not greater than the threshold, the controller 11 records the ink storage amount and the code data of the dummy discharge receptacle 50 to be removed from the printer 1 in association with each other in the memory 12.

When the dummy discharge receptacle 500 is positioned at the replacement position, the controller 11 displays, on the touch panel of the control panel 14, for example, a replacement instruction to replace all the dummy discharge receptacles 500 attached to the sheet conveyance drum 210 and a replacement completion button. The user replaces all the dummy discharge receptacles 500 attached to the sheet conveyance drum 210 based on the replacement instruction of the dummy discharge receptacle 500 displayed on the touch panel of the control panel 14. For example, the user takes out one new dummy discharge receptacle 500 from the package in which three new dummy discharge receptacles 500 are packed, which is prepared in advance, and replaces the dummy discharge receptacle 500 at the replacement position with the new dummy discharge receptacle 500.

Next, the user turns on and off the switch 20 illustrated in FIG. 4 and manually rotates the sheet conveyance drum 210 to move another dummy discharge receptacle 500 which is not replaced yet to the replacement position. In the same manner as described above, the user takes out another new dummy discharge receptacle 500 from the package, and replaces the dummy discharge receptacle 500 at the replacement position with the new dummy discharge receptacle 500. By repeating this operation, the user replaces the third dummy discharge receptacle 500 with another new dummy discharge receptacle 500. In the example described above, the dummy discharge receptacle 500 is replaced with, but not limited to, a new dummy discharge receptacle. Alternatively, the dummy discharge receptacle 500 may be replaced with a used dummy discharge receptacle having the ink storage amount that is not greater than the threshold.

When the user replaces all the dummy discharge receptacles 500 attached to the sheet conveyance drum 210, the user presses the replacement completion button displayed on the touch panel of the control panel 14. When the replacement completion button displayed on the touch panel is pressed and the controller 11 receives the user's operation indicating replacement completion (Yes in step S2), the controller 11 executes the set detection of the dummy discharge receptacle (step S3). Specifically, the receptacle sensor 25 detects whether the dummy discharge receptacle 500 is set in the attachment position while the sheet conveyance drum 210 makes one rotation. When the receptacle sensor 25 detects the unset attachment position in which the dummy discharge receptacle 500 is not set (No in step S4), the controller 11 causes the sheet conveyance drum 210 to rotate so as to move the unset attachment position of the sheet conveyance drum 210 to the replacement position (step S5). Thus, the user is not required to turn the switch 20 on and off and manually move the unset attachment position to the replacement position, thereby facilitating the user setting the dummy discharge receptacle 500.

When the receptacle sensor 25 detects multiple unset attachment portions, the controller 11 causes the sheet conveyance drum 210 to rotate so as to move the unset attachment position closest to the replacement position among the multiple unset attachment positions to the replacement position after the set detection of the dummy discharge receptacle 500. After the user sets the dummy discharge receptacle 500 at the unset attachment position at the replacement position, the user turns the switch 20 illustrated in FIG. 4 on and off, and manually rotates the sheet conveyance drum 210 so as to move another unset attachment position to the replacement position. Then, in the same manner as described above, the user sets the dummy discharge receptacle 500 in the unset attachment position. After the dummy discharge receptacles 500 are set in all the unset attachment positions, the user presses the replacement completion button as described above, and the controller 11 executes the set detection again.

In the present embodiment, the user turns the switch 20 on and off and manually rotates the sheet conveyance drum 210 to replace the second or third dummy discharge receptacle 500 or to sets the dummy discharge receptacle 500 in the second or third unset attachment position, but the user's operation is not limited thereto. For example, as the user presses the switch 20 illustrated in FIG. 4, the sheet conveyance drum 210 may automatically rotate to move the next attachment position for replacement or the next unset attachment position to the replacement position.

In this case, the sheet conveyance drum 210 automatically rotates by pressing the switch 20 to move the next attachment position for replacement or the next unset attachment position to the replacement position, thereby facilitating the user replacing the multiple dummy discharge receptacles 500. On the other hand, when the user turns switch 20 on and off, and manually rotates the sheet conveyance drum 210, if the user stops pressing the switch 20, the sheet conveyance drum 210 stops rotating. Accordingly, the user can safely replace the dummy discharge receptacle 500.

In the above description, the replacement completion button is displayed on the touch panel of the control panel 14, and when the user presses the replacement completion button, the controller 11 executes the set detection of the dummy discharge receptacle 500, but the set detection of the dummy discharge receptacle 500 may be executed as follows. That is, an open-close sensor that detects opening and closing of an outer cover of the image forming unit 200 may be provided, and when the open-close sensor detects that the outer cover is closed, the controller 11 may determines that the replacement is completed and execute the set detection of the dummy discharge receptacle.

When the receptacle sensor 25 detects that all the dummy discharge receptacles 500 are set (Yes in step S4), the controller 11 causes the control panel 14 to display an instruction to input the code data corresponding to the dummy discharge receptacle 500 set in the sheet conveyance drum 210 on the touch panel (step S6). The user takes out, from the package in which the three new dummy discharge receptacles 500 are packed, the paper on which the code data corresponding to the three dummy discharge receptacles 500 is written, which is packed together with the three dummy discharge receptacles 500 in the package, in accordance with the instruction. The user inputs the code data written on the paper with the control panel 14.

Thus, since one piece of code data is assigned to the three dummy discharge receptacles 500 attached to the sheet conveyance drum 210, the user can input the code data corresponding to the three dummy discharge receptacles 500 at a time, differing from the case where the code data is assigned to each dummy discharge receptacle 500, thereby facilitating the user inputting the code data.

As the code data is input, the controller 11 determines whether the input code data follows the predetermined rule. In addition, the controller 11 determines whether the input code data is included in the end history data recorded in the memory 12 (i.e., the code data corresponding to the dummy discharge receptacle 500 that has reached the end).

When the input code data does not follow the predetermined rule, the user may incorrectly input the code data or may have not replaced the dummy discharge receptacle 500. In another case, the user may replace the dummy discharge receptacle 500 with a dummy discharge receptacle which is not compatible with the printer 1 according to the present embodiment. If the dummy discharge receptacle 500 is replaced with a dummy discharge receptacle which is not compatible with the printer 1, the replaced dummy discharge receptacle may not sufficiently receive the dummy discharge from nozzles of the liquid discharge head 230. As a result, the inside of the printer 1 may be stained with ink, and in the worst case, the printer 1 may break down.

Therefore, when the input code data does not follow the predetermined rule (No in step S7), the control panel 14 does not accept the input code data. For example, the controller 11 causes the control panel 14 to display information that there is an error in the input code data on the touch panel, and then to display an instruction to input the code data again on the touch panel (step S6).

When the input code data is included in the end history data, the user may replace the dummy discharge receptacle 500 with a dummy discharge receptacle that has already reached the end. Therefore, when the code data is included in the end history data (No in step S7), the controller 11 causes the control panel 14 to display information that the input code data has been used on the touch panel, and then to display an instruction to input the code data again on the touch panel (step S6). Alternatively, when the code data is included in the end history data, the controller 11 may cause the control panel 14 to display information that the input code data has been used and the dummy discharge receptacle which has reached the end may be mounted, and the process may return to step S1 to replace the dummy discharge receptacle 500 again. The user may select whether to input the code data again or to replace the dummy discharge receptacle 500 again. On the other hand, when the input code data follows the predetermined rule and is not included in the end history data (Yes in step S7), the controller 11 checks whether or not the input code data is recorded in the memory 12 (step S8) As described above, in the present embodiment, the user can operate the control panel 14 at a timing when the user wants to replace the dummy discharge receptacle 500, for example, before the high-volume printing, to execute the replacement mode. As described above, when the user replaces the dummy discharge receptacle 500 at an arbitrary timing, the user may have a used dummy discharge receptacle that can still sufficiently store ink in stock. In this case, for example, when a low-volume printing is performed, the user may replace the dummy discharge receptacle 500 with the used dummy discharge receptacle. As described above, when the dummy discharge receptacle 500 is replaced with the used dummy discharge receptacle, if the ink storage amount is set to "0," the actual ink storage amount in the used dummy discharge receptacle may become full before the ink storage amount calculated by software exceeds the threshold. As a result, the ink may overflow from the used dummy discharge receptacle.

When the user replaces the dummy discharge receptacle 500 with the used dummy discharge receptacle, the user inputs the code data corresponding to the used dummy discharge receptacle. The code data corresponding to the used dummy discharge receptacle has already been input and is recorded in the memory 12 in association with the ink storage amount. Accordingly, when the input code data matches the code data recorded in the memory 12 (Yes in step S8), the controller 11 determines that the dummy discharge receptacle 500 has been replaced with the used dummy discharge receptacle. Then, as post-replacement process, the controller 11 sets (changes) the ink storage amount of the dummy discharge receptacle 500 to the ink storage amount associated with the code data recorded in the memory 12 (step S9) to determine whether the ink storage amount corresponding to the input code data is greater than the threshold recorded in the memory 12. Thus, the controller 11 can correctly manage the ink storage amount of the dummy discharge receptacle 500 on software, thereby preventing the waste ink from overflowing from the dummy discharge receptacle 500. In addition, a storage space in the used dummy discharge receptacle can be used up until the used dummy discharge receptacle reaches the end.

On the other hand, when the input code data is not recorded in the memory 12 (No in step S8), the controller 11 determines that the dummy discharge receptacle 500 is replaced with a new dummy discharge receptacle, and sets (changes) the ink storage amount to "0" as the post-replacement process (step S10). After the controller 11 changes the ink storage amount, the controller 11 finishes the replacement mode, and the printer 1 is available (ready to print).

Figure 9:
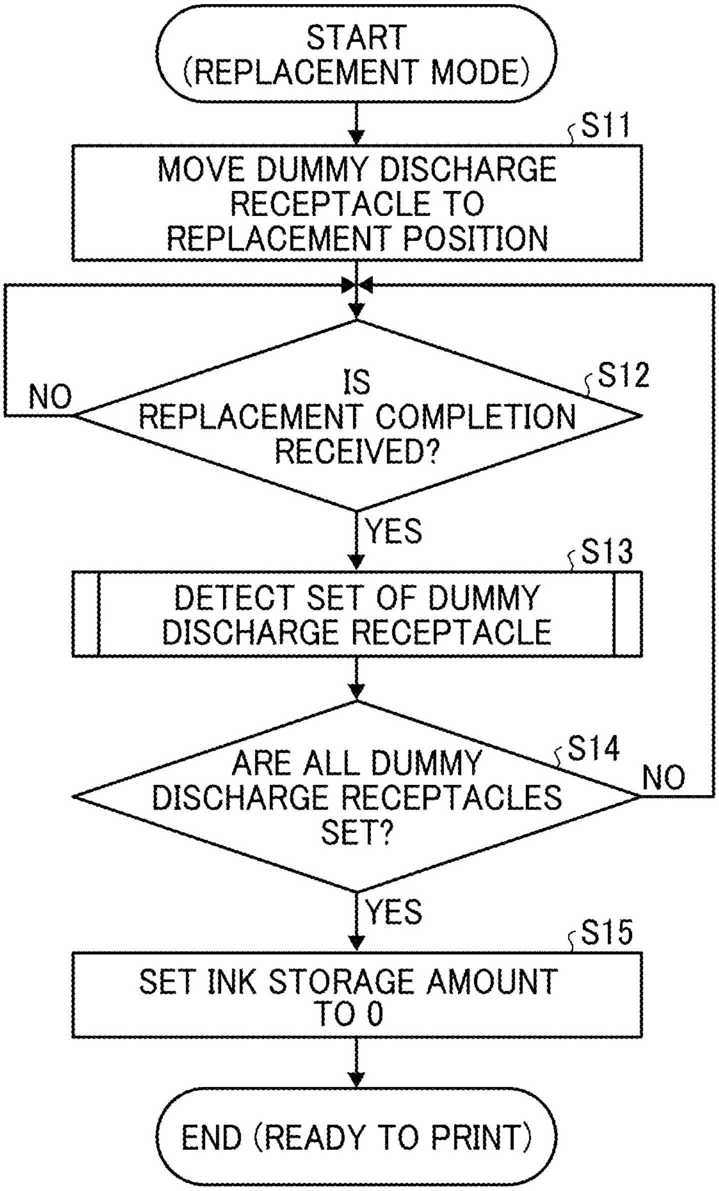
FIG. 9 is a flowchart of control of a replacement mode according to a comparative example.

FIG. 9 illustrates an example of a replacement mode without inputting the code data according to a comparative example. Similarly to the present embodiment, when one of the multiple dummy discharge receptacles 500 attached to the sheet conveyance drum 210 is moved to the replacement position (step S11), the controller 11 causes the control panel 14 to display an instruction to replace the dummy discharge receptacle 500 and the replacement completion button on the touch panel. If the user presses the replacement completion button by mistake (Yes in step S12) before replacing the dummy discharge receptacle 500, in the comparative example illustrated in FIG. 9, the receptacle sensor 25 detects the dummy discharge receptacle 500 that has reached the end (step S13 and Yes in step S14), and the controller 11 sets the ink storage amount in the dummy discharge receptacle 500 to "0" as the post-replacement process (step S15). When the ink storage amount is set to "0," which is below the threshold, the controller 11 does not instructs to execute the replacement mode. As a result, the user may forget to replace the dummy discharge receptacle 500. In this case, although the ink storage amount is set to "0" on software, the actual ink storage amount in the dummy discharge receptacle 500 is almost full. Accordingly, the controller 11 does not correctly manage the remaining storage space in the dummy discharge receptacle 500. If the printer 1 continuously uses such a dummy discharge receptacle 500 as is, the ink may overflow from the dummy discharge receptacle 500.

On the other hand, in the present embodiment, the ink storage amount is changed as the post-replacement process only after the controller 11 causes the control panel 14 to display an instruction to input the code data on the touch panel and the user inputs the code data of the dummy discharge receptacle with which the full dummy discharge receptacle 500 is replaced. The user prepares a new dummy discharge receptacle or a used dummy discharge receptacle, with which the full dummy discharge receptacle 500 is replaced to input the code data of the prepared dummy discharge receptacle. Since the user prepares the dummy discharge receptacle for replacement, the user is less likely to input the code data without replacing the dummy discharge receptacle 500 with the prepared dummy discharge receptacle.

Accordingly, the ink storage amount is not changed when the code data is input without replacement. Thus, in the present embodiment, the ink storage amount is prevented from being changed without replacement, differing from a case in which the ink storage amount is changed after a simple operation of pressing the replacement completion button. As a result, the dummy discharge receptacles 500 is prevented from being continuously used without replacement, thereby preventing the ink from overflowing from the dummy discharge receptacle 500.

Further, in the present embodiment, the ink storage amount is changed when the input code data follows the predetermined rule and does not match the code data, which is recorded in the memory 12, corresponding to the dummy discharge receptacle which has reached the end. Accordingly, the post-replacement process to change the ink storage amount is not executed with the code data that the user incorrectly inputs or with the code data assigned to the used-up dummy discharge receptacle. As a result, the ink storage amount is further prevented from being changed without replacement.

In another embodiment, an identification (ID) chip may be attached to the dummy discharge receptacle. In this case, the controller 11 reads information recorded in the ID chip of the dummy discharge receptacle, determines whether the dummy discharge receptacle 500 has been replaced with a new dummy discharge receptacle or a used dummy discharge receptacle, and changes the ink storage amount as the post-replacement process, thereby preventing the ink storage amount from being changed without replacement. However, the ID chip attached to the dummy discharge receptacle and a device that reads the ID chip may increase the cost of the printer 1. On the other hand, in the present embodiment, the ink storage amount is prevented from being changed without replacement only by the existing hardware originally disposed in the printer 1, thereby avoiding an increase in the cost of the printer 1.

Although the code data is input after the replacement in the above description, the code data corresponding to the dummy discharge receptacle for replacement may be input before the replacement. In such a configuration, the decal on which the code data is written is directly attached to the dummy discharge receptacle, and the user can input the code data while viewing the code data directly recorded on the dummy discharge receptacle for replacement. Then, when the code data input by the user follows the predetermined rule and does not match the code data, which is recorded in the memory 12, corresponding to the dummy discharge receptacle that has reached the end, the controller 11 causes the control panel 14 to display an instruction to replace the dummy discharge receptacle 500 with the dummy discharge receptacle for replacement on the touch panel. The user replaces the dummy discharge receptacle 500 with the dummy discharge receptacle for replacement to which the input code data displayed on the touch panel is assigned. When the replacement is completed, the controller 11 changes the ink storage amount as the post-replacement process. Even when the code data is input before replacement, since the user prepares the dummy discharge receptacle for replacement at hand, the user hardly forgets to replace the dummy discharge receptacle 500 with the prepared dummy discharge receptacle after inputting the code data. Thus, even when the code data is input before replacement, the ink storage amount is not changed without replacement.

The code data may be recorded in a code image such as a barcode or a quick response (QR) code (registered trademark), and the code image is read to input the code data to the printer 1. Specifically, the printer 1 includes a code reader such as a scanner or a bar code reader. For example, the receptacle sensor 25 may also serve as the code reader. The code reader reads the code image corresponding to the dummy discharge receptacle for replacement to acquire the code data. Such a configuration facilitates inputting the code data, differing from a case in which the user inputs the code data with the control panel 14.

Further, in the above description, one piece of code data is assigned to the three dummy discharge receptacles 500 attached to the sheet conveyance drum 210, but one piece of code data may be assigned to each dummy discharge receptacle 500. In this case, the controller 11 causes the control panel 14 to display an instruction to input three pieces of code data (i.e., individual code data) on the touch panel. When one piece of code data is assigned to the three dummy discharge receptacles 500 attached to the sheet conveyance drum 210, the controller 11 manages the group of the three dummy discharge receptacles 500. When one piece of code data is assigned to each dummy discharge receptacle 500, the controller 11 can manage the dummy discharge receptacle 500 individually, thereby facilitating managing the dummy discharge receptacles 500.

In the present embodiment, the present disclosure is applied to the replacement of the dummy discharge receptacle 500. However, for example, the present disclosure can also be applied to replacement of a waste liquid tank as a liquid receptacle that stores waste ink sucked from the nozzles by a suction cap. In the above description, the ink storage amount is changed as the post-replacement process based on the code data. However, examples of the post-replacement process based on the code data further includes a process of canceling the prohibition of the printing operation or a process of finishing the display of the replacement instruction. In addition, as the post-replacement process based on the code data, multiple processes such as changing the ink storage amount, canceling the prohibition of the printing operation, and finishing the display of the replacement instruction may be combined.

In the present embodiment, the "liquid discharge head" refers to a functional component to discharge or eject liquid from the discharge orifice (nozzle). Liquid to be discharged through the nozzle of the liquid discharge head is not limited to a particular liquid as long as the liquid has a viscosity or surface tension to be discharged from the liquid discharge head. However, preferably, the viscosity of the liquid is not greater than 30 mPa·s under ordinary temperature and ordinary pressure or by heating or cooling. Examples of the liquid include a solution, a suspension, or an emulsion that contains, for example, a solvent, such as water or an organic solvent, a colorant, such as dye or pigment, a functional material, such as a polymerizable compound, a resin, or a surfactant, a biocompatible material, such as DNA, amino acid, protein, or calcium, or an edible material, such as a natural colorant. Such a solution, a suspension, or an emulsion can be used for, e.g., inkjet ink, surface treatment solution, a liquid for forming components of electronic element or light-emitting element or a resist pattern of electronic circuit, or a material solution for three-dimensional fabrication. Examples of an energy source for generating energy to discharge liquid include a piezoelectric actuator (a laminated piezoelectric element or a thin-film piezoelectric element), a thermal actuator that employs a thermoelectric conversion element, such as a thermal resistor, and an electrostatic actuator including a diaphragm and a counter electrode.

In the present embodiment, each of the liquid discharge heads includes the plurality of liquid discharge head modules arranged in the sheet width direction, which is orthogonal to the conveyance direction, to form a long liquid discharge head (line head), and the liquid discharge head does not move with respect to an apparatus body of the liquid discharge apparatus. However, the liquid discharge head may be combined with other components to construct a "liquid discharge device," and the liquid discharge unit may print while moving with respect to the apparatus body.

The "liquid discharge device" refers to a liquid discharge head integrated with functional components or mechanisms, i.e., an assembly of components related to liquid discharge. For example, the "liquid discharge device" may include a combination of the liquid discharge head with at least one of a supply-circulation mechanism, a carriage, a maintenance unit, and a main scan moving unit. Here, the integrated unit may be, for example, a combination in which the liquid discharge head and a functional part(s) are secured to each other through. e.g., fastening, bonding, or engaging, and a combination in which one of the liquid discharge head and a functional part(s) is movably held by another. The liquid discharge head may be detachably attached to the functional part(s) or unit(s) each other.

Examples of the liquid discharge device further include the liquid discharge head integrated with the supply-circulation mechanism. In this case, the liquid discharge head and the supply-circulation mechanism may be connected to each other with a tube. Furthermore, a filter unit may be disposed between the supply-circulation mechanism and the liquid discharge head. In another example, the liquid discharge device may be an integrated unit in which a liquid discharge head is integrated with a carriage. As yet another example, the liquid discharge device is a unit in which the liquid discharge head and the main-scanning moving mechanism are combined into a single unit. The liquid discharge head is movably held by a guide that is a part of the main-scanning moving mechanism. In another example, the cap that forms a part of the maintenance device is secured to the carriage mounting the liquid discharge head so that the liquid discharge head, the carriage, and the maintenance device are integrated as a single unit to form the liquid discharge device. Further, in still another example, the liquid discharge device includes tubes connected to the liquid discharge head mounting the supply-circulation mechanism or a channel component so that the liquid discharge head and the supply mechanism are integrated as a single unit. Through the tubes, the liquid in a liquid storage source is supplied to the liquid discharge head. The main-scanning moving mechanism may be a guide only. The supply mechanism may be a tube(s) only or a loading device only.

The "liquid discharge apparatus" includes the liquid discharge head or the liquid discharge device and drives the liquid discharge head to discharge liquid. The liquid discharge apparatus may be, for example, an apparatus capable of discharging liquid to a material onto which liquid can adhere or an apparatus to discharge liquid toward gas or into liquid. The "liquid discharge apparatus" may further include devices relating to feeding, conveying, and ejecting of the material onto which liquid can adhere and also include a pretreatment device and an aftertreatment device.

The "liquid discharge apparatus" may be, for example, an image forming apparatus to form an image on a sheet by discharging ink, or a three-dimensional fabrication apparatus to discharge fabrication liquid to a powder layer in which powder material is formed in layers so as to form a three-dimensional object. The "liquid discharge apparatus" is not limited to an apparatus that discharges liquid to visualize meaningful images such as letters or figures. For example, the liquid discharge apparatus may be an apparatus that forms meaningless images such as meaningless patterns or an apparatus that fabricates three-dimensional images.

The term "material onto which liquid can adhere" represents a material onto which liquid is at least temporarily adhered, a material onto which liquid is adhered and fixed, or a material into which liquid is adhered to permeate. Specific examples of the "material onto which liquid can adhere" include, but are not limited to, a recording medium such as a paper sheet, recording paper, a recording sheet of paper, a film, or cloth, an electronic component such as an electronic substrate or a piezoelectric element, and a medium such as layered powder, an organ model, or a testing cell. The "material onto which liquid can adhere" includes any material to which liquid adheres, unless particularly limited. Examples of the "material onto which liquid can adhere" include any materials to which liquid can adhere even temporarily, such as paper, thread, fiber, fabric, leather, metal, plastic, glass, wood, and ceramic. The shape of the "material onto which liquid can adhere" is not limited to a sheet shape such as the sheet P, and may be any shape as long as liquid can adhere to the material. For example, the "material onto which liquid can adhere" may be used for film products, cloth products such as clothing, building materials such as wallpaper and flooring, and leather products.

The printer 1 according to the present embodiment is the "liquid discharge apparatus" to relatively move the liquid discharge head and the material onto which liquid can adhere. Examples of the liquid discharge apparatus that relatively moves the liquid discharge head and the material onto which liquid can adhere include a serial head apparatus that moves the liquid discharge head or a line head apparatus that does not move the liquid discharge head. The term "liquid discharge apparatus" is not limited to an apparatus to relatively move the liquid discharge head and the material onto which liquid can adhere.

Examples of the "liquid discharge apparatus" further include a treatment liquid coating apparatus to discharge a treatment liquid to a sheet to coat a surface of the sheet with the treatment liquid to reform the sheet surface. Examples of the "liquid discharge apparatus" further include an injection granulation apparatus in which a composition liquid including raw materials dispersed in a solution is injected through nozzles to granulate fine particles of the raw materials. In the present specification, the terms "image formation," "recording," "printing," "image printing," and "fabricating" used herein may be used synonymously with each other.

The embodiments described above are just examples, and the various aspects of the present disclosure attain respective effects as follows.

Aspect 1

A liquid discharge apparatus includes a body, a liquid discharge head such as the liquid discharge head 230, a liquid receptacle such as the dummy discharge receptacle 500, an instruction device such as the control panel 14, and circuitry such as the controller 11. The liquid discharge bead discharges a liquid. The liquid receptacle is replaceable by detachably attaching to the body. The liquid receptacle stores a waste liquid discharged from the liquid discharge head. The instruction device displays an instruction and receives code data assigned to the liquid receptacle. The circuitry causes the instruction device to display the instruction to replace the liquid receptacle storing the waste liquid, an amount of which is greater than a threshold, with another liquid receptacle, and causes the instruction device to display the instruction to input the code data assigned to said another liquid receptacle.

In the comparative example, when the user presses the replacement completion button displayed on the touch panel of the instruction device, the circuitry determines that the user has completed the replacement of the liquid receptacle, and changes the liquid storage amount of the liquid receptacle (i.e., the amount of the waste liquid stored in the liquid receptacle) recorded in the memory to "0" as the post-replacement process. If the user presses the replacement completion button by mistake before replacing the liquid receptacle, the circuitry may change the liquid storage amount of the liquid receptacle recorded in the memory to "0" even though the liquid receptacle has not been replaced. As the liquid storage amount of the liquid receptacle recorded in the memory is changed to "0," the liquid storage amount on the software is less than the threshold, and thus the replacement instruction of the liquid receptacle is not displayed. Accordingly, the user may continue to use the liquid discharge apparatus without replacing the liquid receptacle. Although the liquid storage amount is less than the threshold on software, the actual liquid storage amount of the liquid receptacle exceeds the threshold and is almost full. If the liquid receptacle is continuously used, the liquid may overflow from the liquid receptacle set in the liquid discharge apparatus.

Such a situation may also occur in, for example, a liquid discharge apparatus that is prohibited from being used when the liquid receptacle has been reached the end and that executes the process of canceling the prohibition of use as the post-replacement process after the replacement of the liquid receptacle. For example, if the circuitry cancels the prohibition of use as the post-replacement process without the replacement of the liquid receptacle, the liquid discharge apparatus is continuously used, and thus the liquid may overflow from the liquid receptacle set in the liquid discharge apparatus.

On the other hand, according to Aspect 1, the post-replacement process is not executed unless the code data assigned to the liquid receptacle to be newly set in the liquid discharge apparatus is input. The code data is written directly on the liquid receptacle to be newly set, or the paper on which the code data is written is packed together with the liquid receptacle to be newly set. Thus, the user does not obtain the code data unless the user prepares the liquid receptacle to be newly set at hand to replace the liquid receptacle. As a result, the user is prevented from inputting the code data without replacing the liquid receptacle. Since the user prepares the liquid receptacle to be newly set at hand, the user may not only input the code data without replacing the liquid receptacle.

As described above, the user inputs the code data assigned to the liquid receptacle to be newly set or which has been newly set in the liquid discharge apparatus to execute the post-replacement process. Thus, in the present embodiment, the post-replacement process is prevented from being executed without replacement, differing from a case in which the post-replacement process is executed after a simple operation of pressing the replacement completion button. This configuration prevents the circuitry from executing the predetermined post-replacement process such as resetting the management of the remaining storage space in the liquid receptacle, finishing the replacement instruction, and canceling the prohibition of use until the liquid receptacle is actually replaced. Therefore, the liquid receptacle which is full of the waste liquid is prevented from being continuously used, thereby preventing the waste liquid from overflowing from the liquid receptacle set in the liquid discharge apparatus.

Aspect 2

In Aspect 1, the liquid discharge apparatus further includes a memory such as the memory 12 to record the amount of the waste liquid stored in the liquid receptacle such as the dummy discharge receptacle 500. The circuitry changes the amount of the waste liquid recorded in the memory in a post-replacement process executed after the liquid receptacle is replaced based on the code data received by the instruction device.

With this configuration, as described in the above embodiment, the liquid storage amount is prevented from being changed without replacement. As a result, the liquid storage amount recorded in the memory does not fall below the actual liquid storage amount of the liquid receptacle, thereby preventing the liquid from overflowing from the liquid receptacle set in the liquid discharge apparatus.

Aspect 3

In Aspect 2, the circuitry such as the controller 11 calculates the amount of the waste liquid in the liquid receptacle based on an amount of the waste liquid discharged from the liquid discharge head such as the liquid discharge head 230. The circuitry causes the memory such as the memory 12 to record the amount calculated by the circuitry, and causes the instruction device such as the control panel 14 to display the instruction to replace the liquid receptacle such as the dummy discharge receptacle 500 when the amount calculated be the circuitry is greater than the threshold.

With this configuration, as described in the above embodiment, the circuitry can instruct the user to replace the liquid receptacle such as the dummy discharge receptacle 500 at an appropriate timing, for example, when the liquid receptacle is almost full.

Aspect 4

In Aspect 2 or 3, the circuitry such as the controller 11 causes the memory such as the memory 12 to record the code data and the amount of the waste liquid associated with the code data. The circuitry sets the amount of the waste liquid associated with the code in the memory when the code data received by the instruction device matches the code data recorded in the memory, and set the amount of the waste liquid to 0 when the code data received by the instruction device does not match the code data recorded in the memory.

With this configuration, as described in the above embodiment, even when the used dummy discharge receptacle is used, the liquid storage amount on software is prevented from significantly falling below the actual liquid storage amount. As a result, the liquid such as the ink is prevented from overflowing from the liquid receptacle even when the liquid receptacle is replaced with the used dummy discharge receptacle.

On the other hand, when the code data is not recorded in the memory, the circuitry determines that the liquid receptacle has been replaced with a new liquid receptacle. Accordingly, the circuitry sets the liquid storage amount to "0," to use up the replaced new liquid receptacle to the end.

Aspect 5

In Aspect 4, the circuitry such as the controller 11 causes the memory such as the memory 12 to record other data associated with the code data in addition to the amount of the waste liquid in the liquid receptacle associated with the code data.

With this configuration, as described in the above embodiment, the liquid discharge apparatus can be analyzed using data, which is recorded in the memory in association with the code data, other than the liquid storage amount.

Aspect 6

In any one of Aspects 1 to 5, the liquid discharge apparatus further includes a memory such as the memory 12 to record the code data corresponding to the liquid receptacle such as the dummy discharge receptacle 500 storing the waste liquid, the amount of which is greater than the threshold, as an end code data. The circuitry does not execute the post-replacement process when the code data matches the end code data.

With this configuration, as described in the above embodiment, even if the liquid receptacle such as the dummy discharge receptacle 500 is replaced with the liquid receptacle that has reached the end, and the user inputs the code data of the liquid receptacle at the end, the post-replacement process such as changing the liquid storage amount is not executed. As a result, the liquid receptacle at the end is prevented from being used as is, thereby preventing the liquid such as the ink from overflowing from the liquid receptacle set in the liquid discharge apparatus.

Aspect 7

In any one of aspects 1 to 6, the circuitry determines whether the code data received by the instruction device follows a predetermined rule, and does not execute the post-replacement process when the code data does not follow the predetermined rule.

With this configuration, as described in the above embodiment, the circuitry does not execute the post-replacement process such as changing the liquid storage amount based on the input code data that the user incorrectly inputs without replacement. As a result, the circuitry is prevented from executing the post-replacement process such as enabling the liquid discharge apparatus, finishing the replacement instruction, and changing the liquid storage amount without replacement. Therefore, the liquid receptacle which is full of the liquid is prevented from being continuously used, thereby preventing the liquid from overflowing from the liquid receptacle set in the liquid discharge apparatus.

Aspect 8

In any one of Aspects 1 to 7, the liquid discharge apparatus further includes a conveyance drum such as the sheet conveyance drum 210 to rotate to convey a medium to a discharge position facing the liquid discharge head such as the liquid discharge head 230. The liquid receptacle such as the dummy discharge receptacle 500 is detachably attached to the conveyance drum to receive the waste liquid discharged from the liquid discharge head.

With this configuration, the liquid can be dummy-discharged to the liquid receptacle such as the dummy discharge receptacle 500 when the liquid discharge head faces the conveyance drum such as the sheet conveyance drum 210.

Aspect 9

In Aspect 8, the liquid receptacle includes multiple liquid receptacles such as the multiple dummy discharge receptacles 500 associated with identical code data. The circuitry causes the instruction device such as the control panel 14 to display an instruction to replace all the multiple liquid receptacles attached to the conveyance drum such as the sheet conveyance drum 210.

With this configuration, as described in the above embodiment, the code data is easily input as compared with the case where one piece of the code data is assigned to each of the multiple liquid receptacles such as the multiple dummy discharge receptacles 500.

Aspect 10

In Aspect 8, the code data includes multiple code data different with each other, and the liquid receptacle includes multiple liquid receptacles such as the multiple dummy discharge receptacles 500 respectively associated with the multiple code data.

With this configuration, as described in the above embodiment, the liquid receptacle is easily managed as compared with the case where one piece of the code data is assigned to the multiple liquid receptacles attached to the conveyance drum.

Aspect 11

In any one of Aspects 8 to 10, the circuitry causes the conveyance drum such as the sheet conveyance drum 210 to rotate to move the liquid receptacle such as the dummy discharge receptacle 500 to a replacement position at which the liquid receptacle is replaceable.

With this configuration, as described in the above embodiment, the space is disposed only around the replacement position (predetermined rotation position) of the dummy discharge receptacle 500 to allow the dummy discharge receptacle 500 to be attached to and detached from the conveyance drum, thereby increasing the degree of freedom in the layout in the liquid discharge apparatus.

Aspect 12

In any one of Aspects 8 to 11, the liquid discharge apparatus further includes a receptacle sensor such as the receptacle sensor 25 to detect the liquid receptacle in the conveyance drum such as the sheet conveyance drum 210. The liquid receptacle includes multiple liquid receptacles such as the multiple dummy discharge receptacles 500 detachably attached to the conveyance drum. The multiple liquid receptacles are disposed in the conveyance drum at predetermined intervals in a rotation direction of the conveyance drum.

With this configuration, the liquid discharge apparatus is prevented from being used with the liquid receptacle such as the dummy discharge receptacle 500 unset.

Aspect 13

In Aspect 12, the conveyance drum such as the sheet conveyance drum 210 has multiple attachments to which the multiple liquid receptacles such as the multiple dummy discharge receptacles 500 are attached and a replacement position at which one of the multiple attachments of the conveyance drum is disposed to replace one of the multiple liquid receptacles. The circuitry such as the controller 11 causes the conveyance drum to rotate to move said one of the multiple attachments to the replacement position when the receptacle sensor such as the receptacle sensor 25 detects that said one of the multiple attachments does not attach said one of the multiple liquid receptacles (i.e., an unset attachment position).

With this configuration, as described in the above embodiment, the liquid receptacle such as the dummy discharge receptacle 500 can be easily set in the conveyance drum such as the sheet conveyance drum 210 as compared with the case where the conveyance drum is manually rotated to move the unset attachment position of the conveyance drum in which the liquid receptacle is not set to a replacement position to attach the liquid receptacle.

Aspect 14

In Aspect 13, when the receptacle sensor such as the receptacle sensor 25 detects that two or more of the multiple attachments do not attach two or more of the multiple liquid receptacles such as the multiple dummy discharge receptacles 500, the circuitry such as the controller 11 determine said one of the multiple attachments closest to the replacement position among said two or more of the multiple attachments and cause the conveyance drum to rotate to move said one of the multiple attachments to the replacement position.

With this configuration, the unset attachment position of the conveyance drum such as the sheet conveyance drum 210 in which the liquid receptacle such as the dummy discharge receptacles 500 is not set is quickly moved to the replacement position (predetermined rotation position) to attach the liquid receptacle.

Aspect 15

In Aspect 11, 13, or 14, the liquid receptacle includes multiple liquid receptacles such as the multiple dummy discharge receptacles 500 detachably attached to the conveyance drum such as the sheet conveyance drum 210. The multiple liquid receptacles are disposed in the conveyance drum at predetermined intervals in a rotation direction of the conveyance drum. The conveyance drum is manually rotatable.

With this configuration, as described in the above embodiment, after the liquid receptacle to be replaced is set at the replacement position, the conveyance drum is manually rotated to move another liquid receptacle to the replacement position. With this configuration, the multiple liquid receptacles can be safely replaced as compared with the case where the conveyance drum is automatically rotated to move another liquid receptacle to the replacement position after the liquid receptacle to be replaced is set at the replacement position.

Aspect 16

In Aspect 11, 13, or 14, the liquid receptacle includes multiple liquid receptacles such as the multiple dummy discharge receptacles 500 detachably attached to the conveyance drum such as the sheet conveyance drum 210. The multiple liquid receptacles are disposed in the conveyance drum at predetermined intervals in a rotation direction of the conveyance drum. The conveyance drum has multiple attachments to which the multiple liquid receptacles are attached and a replacement position at which one of the multiple attachments of the conveyance drum is disposed to replace one of the multiple liquid receptacles. The circuitry such as the controller 11 causes the conveyance drum to rotate to move another of the multiple attachments to the replacement position after said one of the multiple attachments has attached said one of the multiple liquid receptacles at the replacement position.

With this configuration, workability to replace the multiple liquid receptacles can be improved as compared with the case where the conveyance drum is manually rotated to move another liquid receptacle to the replacement position.

Aspect 17

In any one of Aspects 1 to 16, the liquid discharge apparatus further includes a conveyance drum such as the sheet conveyance drum 210 to rotate to convey a medium to a discharge position facing the liquid discharge head such as the liquid discharge head 230 and a receptacle sensor such as the receptacle sensor 25 to detect the liquid receptacle such as the dummy discharge receptacle 500 in the conveyance drum. The circuitry such as the controller 11 prohibits the liquid discharge head from discharging the liquid when the receptacle sensor does not detect the liquid receptacle in the conveyance drum.

With this configuration, the liquid discharge apparatus is prevented from being stained with the liquid drained from the liquid discharge head, thereby preventing the liquid discharge apparatus from being damaged.

Aspect 18

In any one of aspects 1 to 17, the liquid discharge apparatus further includes a code reader to read a code image indicating the code data.

With this configuration, as described in the above embodiment, the user can read the code image with the code reader to complete inputting the code data, thereby improving the workability to replace the liquid receptacle.

As described above, according to the present embodiment, the liquid is prevented from overflowing from the liquid receptacle.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A liquid discharge apparatus comprising:

a body;

a liquid discharge head configured to discharge a liquid;

a liquid receptacle replaceable by detachably attaching to the body, the liquid receptacle configured to store a waste liquid discharged from the liquid discharge head;

an instruction device configured to display an instruction and receive code data assigned to the liquid receptacle; and circuitry configured to:

cause the instruction device to display the instruction to replace the liquid receptacle storing the waste liquid, an amount of which is greater than a threshold, with another liquid receptacle; and cause the instruction device to display the instruction to input the code data assigned to said another liquid receptacle.

2. The liquid discharge apparatus according to claim 1, further comprising:

a memory configured to record the amount of the waste liquid stored in the liquid receptacle, wherein the circuitry is further configured to change the amount of the waste liquid recorded in the memory in a post-replacement process executed after the liquid receptacle is replaced based on the code data received by the instruction device.

3. The liquid discharge apparatus according to claim 2, wherein the circuitry is further configured to:

calculate the amount of the waste liquid in the liquid receptacle based on an amount of the waste liquid discharged from the liquid discharge head;

cause the memory to record the amount calculated by the circuitry; and cause the instruction device to display the instruction to replace the liquid receptacle when the amount calculated by the circuitry is greater than the threshold.

4. The liquid discharge apparatus according to claim 2, wherein the circuitry is further configured to:

cause the memory to record the code data and the amount of the waste liquid associated with the code data;

set the amount of the waste liquid associated with the code data in the memory when the code data received by the instruction device matches the code data recorded in the memory; and set the amount of the waste liquid to 0 when the code data received by the instruction device does not match the code data recorded in the memory.

5. The liquid discharge apparatus according to claim 4, wherein the circuitry is further configured to cause the memory to record other data associated with the code data in addition to the amount of the waste liquid in the liquid receptacle associated with the code data.

6. The liquid discharge apparatus according to claim 1, further comprising:

a memory configured to record the code data corresponding to the liquid receptacle storing the waste liquid, the amount of which is greater than the threshold, as an end code data, wherein the circuitry does not execute the post-replacement process when the code data matches the end code data.

7. The liquid discharge apparatus according to claim 2, wherein the circuitry is further configured to:

determine whether the code data received by the instruction device follows a predetermined rule; and does not execute the post-replacement process when the code data does not follow the predetermined rule.

8. The liquid discharge apparatus according to claim 1, further comprising a conveyance drum configured to rotate to convey a medium to a discharge position facing the liquid discharge head, wherein the liquid receptacle is detachably attached to the conveyance drum to receive the waste liquid discharged from the liquid discharge head.

9. The liquid discharge apparatus according to claim 8, wherein the liquid receptacle includes multiple liquid receptacles associated with an identical code data, and the circuitry is configured to cause the instruction device to display an instruction to replace all the multiple liquid receptacles attached to the conveyance drum.

10. The liquid discharge apparatus according to claim 8, wherein the code data includes multiple code data different with each other, and the liquid receptacle includes multiple liquid receptacles respectively associated with the multiple code data.

11. The liquid discharge apparatus according to claim 8, wherein the circuitry is further configured to cause the conveyance drum to rotate to move the liquid receptacle to a replacement position at which the liquid receptacle is replaceable.

12. The liquid discharge apparatus according to claim 11, wherein the liquid receptacle includes multiple liquid receptacles detachably attached to the conveyance drum, the multiple liquid receptacles are disposed in the conveyance drum at predetermined intervals in a rotation direction of the conveyance drum, and the conveyance drum is manually rotatable.

13. The liquid discharge apparatus according to claim 11, wherein the liquid receptacle includes multiple liquid receptacles detachably attached to the conveyance drum, the multiple liquid receptacles are disposed in the conveyance drum at predetermined intervals in a rotation direction of the conveyance drum, the conveyance drum has:

multiple attachments to which the multiple liquid receptacles are attached; and a replacement position at which one of the multiple attachments of the conveyance drum is disposed to replace one of the multiple liquid receptacles, and the circuitry is further configured to cause the conveyance drum to rotate to move another of the multiple attachments to the replacement position after said one of the multiple attachments has attached said one of the multiple liquid receptacles at the replacement position.

14. The liquid discharge apparatus according to claim 8, further comprising a receptacle sensor configured to detect the liquid receptacle in the conveyance drum, wherein the liquid receptacle includes multiple liquid receptacles detachably attached to the conveyance drum, and the multiple liquid receptacles are disposed in the conveyance drum at predetermined intervals in a rotation direction of the conveyance drum.

15. The liquid discharge apparatus according to claim 14, wherein the conveyance drum has:

multiple attachments to which the multiple liquid receptacles are attached; and a replacement position at which one of the multiple attachments of the conveyance drum is disposed to replace one of the multiple liquid receptacles, and the circuitry is further configured to cause the conveyance drum to rotate to move said one of the multiple attachments to the replacement position when the receptacle sensor detects that said one of the multiple attachments does not attach said one of the multiple liquid receptacles.

16. The liquid discharge apparatus according to claim 15, wherein when the receptacle sensor detects that two or more of the multiple attachments do not attach two or more of the multiple liquid receptacles, the circuitry is further configured to:

determines said one of the multiple attachments closest to the replacement position among said two or more of the multiple attachments; and cause the conveyance drum to rotate to move said one of the multiple attachments to the replacement position.

17. The liquid discharge apparatus according to claim 1, further comprising:

a conveyance drum configured to rotate to convey a medium to a discharge position facing the liquid discharge head; and a receptacle sensor configured to detect the liquid receptacle in the conveyance drum, wherein the circuitry is further configured to prohibit the liquid discharge head from discharging the liquid when the receptacle sensor does not detect the liquid receptacle in the conveyance drum.

18. The liquid discharge apparatus according to claim 1, further comprising a code reader configured to read a code image indicating the code data.

* * * * *